(12) United States Patent
Czerner

(10) Patent No.: US 9,624,781 B2
(45) Date of Patent: Apr. 18, 2017

(54) GAS TURBINE BLADE FOR AN AIRCRAFT ENGINE AND METHOD FOR COATING A GAS TURBINE BLADE

(71) Applicant: LUFTHANSA TECHNIK AG, Hamburg (DE)

(72) Inventor: Stefan Czerner, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 315 days.

(21) Appl. No.: 14/372,157

(22) PCT Filed: Jan. 10, 2013

(86) PCT No.: PCT/EP2013/000057
§ 371 (c)(1),
(2) Date: Jul. 14, 2014

(87) PCT Pub. No.: WO2013/104541
PCT Pub. Date: Jul. 18, 2013

(65) Prior Publication Data
US 2015/0003990 A1    Jan. 1, 2015

(30) Foreign Application Priority Data

Jan. 13, 2012 (DE) .......................... 10 2012 200 491

(51) Int. Cl.
*F01D 5/28*    (2006.01)
(52) U.S. Cl.
CPC ............. *F01D 5/288* (2013.01); *F01D 5/282* (2013.01); *F01D 5/286* (2013.01);
(Continued)

(58) Field of Classification Search
CPC ............................. F01D 5/286; F05D 2230/31
See application file for complete search history.

(56) References Cited

U.S. PATENT DOCUMENTS 5,486,096 A * 1/1996 Hertel ..................... B64C 27/46
                                                                 156/313
6,059,533 A * 5/2000 Stoker ....................... C23C 4/02
                                                                 415/119

(Continued)

FOREIGN PATENT DOCUMENTS

DE            199 34 856        1/2001
DE       10 2007 031 932        1/2009
(Continued)

*Primary Examiner* — John K Fristoe, Jr.
*Assistant Examiner* — Michael Sehn
(74) *Attorney, Agent, or Firm* — Saliwanchik, Lloyd & Eisenschenk

(57) ABSTRACT

Embodiments relate to a gas turbine blade for an aircraft engine, the gas turbine blade having a flow leading edge, a flow trailing edge, a suction side, and a pressure side, where the suction side and pressure side extend from the flow leading edge to the flow trailing edge, wherein the gas turbine blade has a damping layer on the flow leading edge and the damping layer comprising at least one matrix material and particles held in position by this matrix material. Further embodiments relate to a method of coating a gas turbine blade and a gas turbine incorporating a plurality of gas turbine blades in accordance with embodiments of the invention.

21 Claims, 1 Drawing Sheet

(52) U.S. Cl.
CPC ...... *F05D 2230/31* (2013.01); *F05D 2230/90* (2013.01); *F05D 2300/6033* (2013.01); *Y02T 50/672* (2013.01); *Y02T 50/673* (2013.01)

(56) References Cited

U.S. PATENT DOCUMENTS

| | | |
|---|---|---|
| 6,402,476 B1 | 6/2002 | Bossmann et al. |
| 7,846,561 B2 | 12/2010 | Kulkarni |
| 8,591,196 B2 | 11/2013 | Hardwicke |
| 2009/0162207 A1* | 6/2009 | Peters .................. B23K 26/10 416/224 |
| 2009/0317236 A1* | 12/2009 | Hardwicke ............ C23C 30/00 415/119 |
| 2010/0266419 A1 | 10/2010 | Reinmöller et al. |

FOREIGN PATENT DOCUMENTS

| | | |
|---|---|---|
| DE | 10 2007 042 124 | 3/2009 |
| DE | 10 2009 032 564 | 1/2011 |
| EP | 2 072 176 | 6/2009 |
| EP | 2 343 394 | 7/2011 |
| JP | S64-77702 | 3/1989 |
| WO | WO-96/00842 | 1/1996 |
| WO | WO-2009/109410 | 9/2009 |
| WO | WO-2010/066548 | 6/2010 |

* cited by examiner

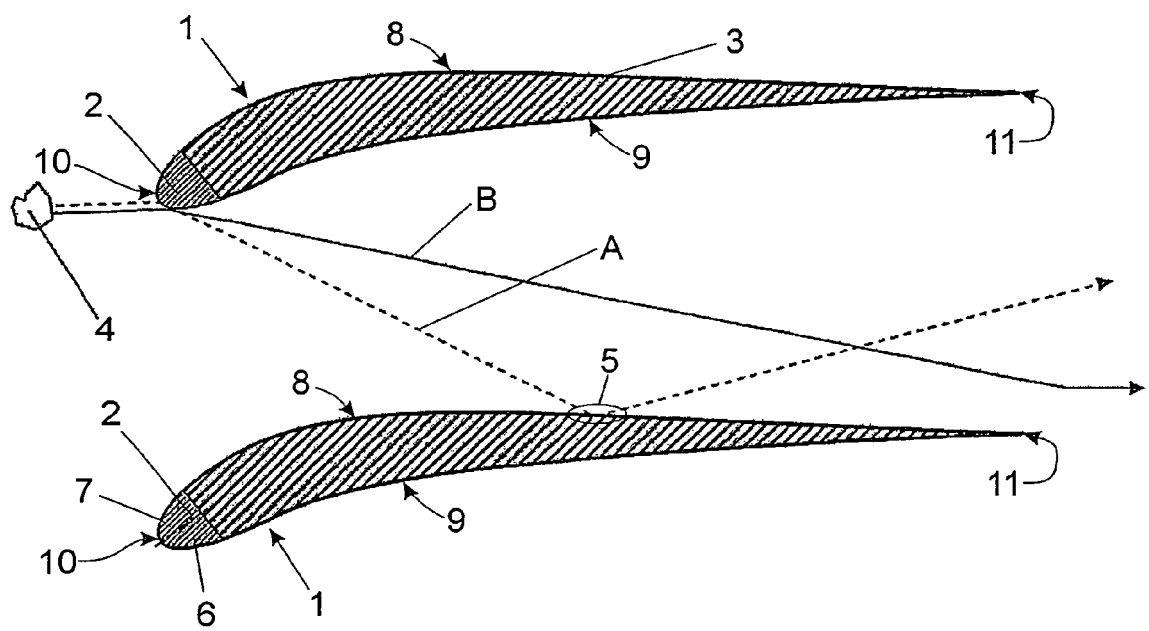

GAS TURBINE BLADE FOR AN AIRCRAFT ENGINE AND METHOD FOR COATING A GAS TURBINE BLADE

CROSS-REFERENCE TO RELATED APPLICATIONS

The present application is the U.S. National Stage Application of International Patent Application No. PCT/EP2013/000057, filed on Jan. 10, 2013, which claims priority to German Patent Application No. 10 2012 200 491.2, filed on Jan. 13, 2012, both of which are hereby incorporated by reference herein in their entirety, including any figures, tables, or drawings.

The invention relates to a gas turbine blade for an aircraft engine and to a method for coating a gas turbine blade.

Gas turbine blades, more particularly gas turbine blades used in aircraft engines, are subject to abrasive wear during operation owing to sand, dust, drops of liquid and other abrasive materials.

In particular with the flow leading edges of compressor blades of an aircraft engine, this abrasive wear leads to wear of the blade profile, in some cases after just 1000 flying hours, and this wear is unfavourable in aerodynamic terms.

In addition, adhesive particles, such as dirt, settle on the suction and/or pressure sides of gas turbine blades, and this causes the boundary layer on the suction side of the blade to become thicker and can thus lead to adverse effects on the flow conditions.

In order to counteract abrasive wear, it is known from the prior art, for example from EP 2 072 176 A1, DE 10 2009 032 564 A1 or EP 2 343 394 A1, to provide gas turbine blades with anti-wear layers using special coating methods.

The problem here is that these (sometimes thin) layers are eroded by particles flying at the blades, such as grains of sand, the particles and/or grains of sand eroding any coating and/or the base material of the blade by impacting the leading edge and/or by then impacting the suction-side face of the gas turbine blade.

Once the anti-wear layers have been eroded, the gas turbine blade has no protection and is then subject to severe abrasive wear.

In addition, thick hard layers are often associated with the problem that hard substances, such as grains of sand, flying at the blade rebound off the hard layer, lose little of their kinetic energy and strike the regions of other components or of the engine and can cause severe abrasive wear to locations with relatively little protection.

The problem addressed by the invention is thus to provide a gas turbine blade for an aircraft engine which has improved wear properties, and to provide a method for coating a gas turbine blade.

The invention achieves this object with the features of the independent claims.

To solve this object, a gas turbine blade for an aircraft engine is thus proposed, the gas turbine blade having a flow leading edge and a flow trailing edge and a suction side and a pressure side therebetween, wherein the gas turbine blade has a damping layer on the flow leading edge and the damping layer comprising at least one matrix material and particles set in this matrix material at least in part.

This damping layer provided according to the invention can improve the wear properties of the gas turbine blade. The damping layer gives the gas turbine blade improved wear properties owing to the particle composite material. The particle composite material comprises a matrix, the material of which can be the same as for example the base material of the gas turbine blade, and particles set into this matrix material.

In this context, "set into" means that the particles are held in position and fixed by the matrix material. They can be completely surrounded by the matrix material, or a part of their surface can be exposed outside the matrix material.

Preferably, at least a small number of particles are only partly surrounded by the matrix material and project out of the matrix material, so that for example a grain of sand flying at the material impacts the particle directly and not the matrix material surrounding the particle. In this preferred case, at least a small number of particles form the foremost incoming-flow points of the flow leading edge.

In principle, a foremost particle front of this type is formed automatically by the layer according to the invention, since the matrix material wears away relatively quickly and thus the particles located therebelow are exposed. As a result, an advantageous leading edge is formed without any special measures.

Interaction of the particles and the matrix material leads to improved damping and wear properties. If a grain of sand impacts the particle, some of the kinetic energy is transferred to the particle. However, the matrix material "cushions" the particles set therein. The matrix elastically deforms and absorbs some of the kinetic energy that has been transferred to the particle by the grain of sand. Once the grain of sand is no longer in contact with the particle, the particle springs back into its previous position owing to the resilient restoring movement of the matrix material.

In this way, the kinetic energy of the grain of sand which causes the abrasive wear is absorbed by the matrix, and the resultant abrasive wear of the flow leading edge is also less severe, since the particles impacted by the grain of sand are subject to less abrasive wear.

Owing to the aforesaid spring action of the matrix material, the problem of the grain of sand rebounding and losing little of its kinetic energy, as is the case with hard layers, does not occur, but rather the relatively soft resilient matrix can absorb the kinetic energy and dissipate it in the volume or convert the energy by internal friction. The matrix material is protected by the particles from abrasive wear by hard abrasive substances, which wear would occur relatively quickly and severely with a soft matrix material. Therefore, the advantageous properties of a soft matrix material can be combined with relatively rigid particles owing to the damping layer having a particle composite material according to invention.

In addition, the trajectory of the grain of sand can also be advantageously influenced by this damping effect. After rebounding on the leading edge, the grain of sand can be prevented from hitting the suction side of the adjacent gas turbine blade and causing additional abrasive wear here (as can happen in the prior art), which in turn leads to a deterioration of the aerodynamic properties of the components. As is illustrated below in FIG. 1, a more advantageous trajectory of the grains of sand (and other substances) flying at the blade can be achieved owing to the damping layer according to the invention.

The damping layer preferably has a thickness, which is advantageous for the wear behaviour, in a range between 0.3 and 10 mm, more preferably in a range between 1 and 5 mm.

The particles in the damping layer wear away less severely than the matrix material, in particular when they are designed to be harder than the matrix material. Accordingly, it is preferred that the particles are designed as hard material particles having a greater hardness than the matrix material.

In this context, it is not necessary for all the particles to have the same high hardness, although it is preferable that at least some of the particles are designed as hard material particles having a greater hardness than the matrix material. Preferably, the particles comprise carbides, nitrides and/or oxides, since these are advantageous for such a purpose given their high hardness.

For example, particles comprising vanadium carbide, titanium carbide and/or tungsten carbide are preferred.

Proportions by volume of the particles on the damping layer that are preferred and are advantageous for the damping behaviour are in a range between 8% and 95%. More preferably, the proportion by volume of the particles on the damping layer is in a range between 20% and 60%. Accordingly, the proportion by volume of the particles is preferably higher than the proportion by volume of the matrix material. However, it may be preferable in some applications for the proportion by volume of the matrix material to be higher than the proportion by volume of the particles.

As aforesaid, the matrix material is preferably of the same type as the base material of the blade; in other words, it consists of the same material as the rest of the blade. However, it may be preferable in some applications for the matrix material to comprise materials of a different type, for example cobalt-based and/or nickel-based materials. In this case, care must be taken with the heat expansions of the materials, which may potentially be different, so that the desired blade contour is also provided during operation.

Preferably, at least one portion of the suction side of the gas turbine blade has an anti-adhesion layer. This anti-adhesion layer is used to prevent dirt and other substances from adhering to the suction side of the gas turbine blade. The desired aerodynamic, advantageous geometry can thus be better maintained, it thereby being possible to avoid deteriorations in the efficiency of the engine and to save fuel. The anti-adhesion coating is preferably a ceramic layer and consists for example of nitrides or oxides. Advantageous anti-adhesion layers are produced for example from titanium nitride, silicon nitride, chromium nitride, titanium oxide, silicon oxide and chromium oxide. The anti-adhesion layer can also comprise a diamond-like carbon layer or a modified hydrogen-containing amorphous carbon layer.

In all, a distinction has to be made between two erosion regions. One erosion region is found in the region of the leading edge or the damping layer and a second is found on the suction side of the gas turbine blade. The anti-adhesion layer is provided in this second erosion region, preferably at a distance of 30% to 70% of the chord lengths of the front edge.

Preferably, the anti-adhesion layer has a thickness in a range between 100 nm and 900 nm. It is accordingly preferably smaller than 1 μm and is many times thinner than the damping layer.

The particle distribution in the damping layer can be used in a targeted manner to control the change in geometry of the flow leading edge caused by the abrasive wear. Typically, the flow leading edge flattens to form a substantially planar end face. In this context, "substantially planar" should be understood to mean that the edge is flat or planar but still has a high surface roughness. In terms of the aerodynamic properties, a leading edge that has been worn down in this way is significantly worse than a round leading edge.

Since abrasive wear of the gas turbine blades can indeed be reduced by the damping layer according to the invention, although not completely prevented, the progression of the wear is preferably controlled so as to be aerodynamically more advantageous.

Since the damping layer preferably has a higher particle concentration in its pressure-side region than in its suction-side region, the suction-side region wears down somewhat more than the pressure-side region. The higher particle concentration in the pressure-side region of the flow edge leads to relatively slow abrasive wear. As a result, overall a substantially planar end face is not formed during operation, but rather the lower (pressure-side) region of the flow leading edge remains relatively intact and the upper (suction-side) region of the flow leading edge is more severely eroded.

Therefore, different erosion is achieved overall, whereby a more advantageous wear contour of the flow leading edge is formed, as would be the case with particles having the same distribution (or with no particles at all). The suction-side region of the flow leading edge flattens more sharply than the pressure-side region of the flow leading edge, whereby the wear contour that forms is at least comparatively more similar to the new partial contour, which is aerodynamically optimised.

To achieve this object, a method for coating a gas turbine blade for an aircraft engine is also proposed, the gas turbine component being provided with a damping layer as described above. This method allows a gas turbine component to be equipped with the aforesaid advantageous damping layer following or during the production process of the new part, and to thus be improved in terms of wear behaviour.

A deposition welding method is preferably used for the coating. A deposition welding method using a laser is more preferable. Deposition welding methods are well established for gas turbine blades and can be used to apply the damping layer, provided that they are designed accordingly.

The invention will be described below with reference to preferred embodiments and the accompanying drawings, in which:

FIG. 1 is a schematic view of two gas turbine blades according to the invention.

FIG. 1 shows two gas turbine blades 1. In this embodiment, they are two compressor blades of an aircraft engine arranged next to one another. In this case, "next to one another" means that they are arranged on the same moving blade ring adjacent to one another in the same stage of the compressor, for example the second compressor stage.

It goes without saying that the gas turbine blades 1 each have a flow leading edge 10 and a flow trailing edge 11.

The suction side 8 and the pressure side 9 extend between these two edges.

The flow leading edge 10 of both gas turbine blades 1 is provided with a damping layer 2. This damping layer 2 comprises a particle composite material, made from a matrix material, and particles set therein.

The damping layer 2 or the flow leading edge 10 can be divided into a region associated with the suction side 8 and a region associated with the pressure side 9 (as indicated by a dashed line in the lower gas turbine blade 1). There is thus a pressure-side region 6 of the damping layer 2 and a suction-side region 7 of the damping layer 2.

During use, various foreign bodies impact the flow leading edge 10. Alongside relatively soft substances, these may be hard substances such as grains of sand 4. Owing to the fast movement of aircraft, the high flow speeds in the engine and the compressor blades rotating about a central axis at several thousand rpm, the grains of sand 4 impact the flow leading edge 10 at a high relative speed.

In this embodiment, the damping layer 2 is thicker than the abrasive grains of sand 4 flying theretowards. This preferred configuration of the damping layer 2 leads to improved wear properties.

FIG. 1 shows two trajectories A and B. Trajectory A corresponds to the trajectory of a grain of sand 4 prior to and following impact on a flow leading edge 10 that does not have a damping layer 2 according to the invention. Trajectory B corresponds to the trajectory of a grain of sand 4 prior to and following impact on a flow leading edge 10 having the damping layer 2 according to the invention.

At first, the trajectory of the grain of sand 4 is directed straight at the flow leading edge 10. In the case of a hard coating on the flow leading edge 10 of the upper gas turbine blade 1, the grain of sand 4 would impact the suction side 8 of the lower gas turbine blade 1 according to trajectory A, an erosion region 5 thus forming at this point, which causes a deterioration in the aerodynamic properties of the gas turbine blade 1.

In the case of trajectory B, the grain of sand 4 does not impact the suction side 8 of the lower gas turbine blade 1. This is down to the particle composite material of the damping layer 2. The hard particles protect against abrasive wear, while the comparatively soft matrix has a damping effect. In this way, kinetic energy is absorbed, but the wear that occurs is thereby reduced.

As shown in FIG. 1, the grain of sand 4 does not collide with the suction side 8 of the lower gas turbine blade 1, but rather flies between the two, so as to then hit for example other gas turbine blades 1 having a damping layer 2. These gas turbine blades 1 arranged one behind the other thus absorb the kinetic energy of the grain of sand 4 in a manner that is relatively gentle on the material.

The pressure-side region 6 of the damping layer 2 preferably has a higher concentration of particles by comparison with the suction-side region 7 of the damping layer 2. As a result, the pressure-side region 6 wears away less severely than the suction-side region 7 of the damping layer 2. In this way, the wear contour that forms during operation, in other words the geometric shape of the flow leading edge, is improved in terms of its aerodynamic properties. The flow leading edge 10 has less of a planar shape, but a contour is formed that is at least closer to the new partial contour than a wear contour that occurs typically.

In addition, in this embodiment the upper gas turbine blade 1 has an anti-adhesion layer 3 on one part of its suction side 8. The anti-adhesion layer 3 prevents or reduces the number of adherent foreign substances which can also cause a deterioration in the aerodynamic properties of the gas turbine blade 1.

LIST OF REFERENCE NUMERALS 1 gas turbine blade
2 damping layer
3 anti-adhesion layer
4 grain of sand
5 erosion region
6 pressure-side region (of the damping layer)
7 suction-side region (of the damping layer)
8 suction side
9 pressure side
10 flow leading edge
11 flow trailing edge

The invention claimed is:

1. A gas turbine blade, comprising:
   a flow leading edge;
   a flow trailing edge;
   a suction side; and
   a pressure side,
   wherein the suction side and pressure side extend from the flow leading edge to the flow trailing edge,
   wherein the gas turbine blade comprises a damping layer on the flow leading edge,
   wherein the damping layer comprises at least one matrix material and a plurality of particles,
   wherein the plurality of particles are held in position by the at least one matrix material,
   wherein the damping layer comprises a pressure-side region and a suction-side region, and
   wherein the pressure-side region has a pressure-side particle concentration of particles of the plurality of particles in the at least one matrix material that is higher than a suction-side particle concentration of particles of the plurality of particles in the at least one matrix material of the suction-side region.

2. The gas turbine blade according to claim 1, wherein the damping layer has a thickness in a range between 0.3 mm and 10 mm.

3. The gas turbine blade according to claim 1, wherein at least a portion of the particles of the plurality of particles have a particle hardness that is greater than a matrix material hardness of the at least one matrix material.

4. The gas turbine blade according to claim 3, wherein the at least a portion of the particles of the plurality of particles comprise one or more materials selected from the group consisting of:
   a carbide, a nitride, and an oxide.

5. The gas turbine blade according to claim 3, wherein the at least a portion of the particles of the plurality of particles comprise one or more materials selected from the group consisting of:
   vanadium carbide, titanium carbide, and tungsten carbide.

6. The gas turbine blade according to claim 1, wherein a proportion of the damping layer, by volume, of the plurality of particles is in a range between 8% and 95%.

7. The gas turbine blade according to claim 1, wherein a proportion of the damping layer, by volume, of plurality of particles is in a range between 20% and 60%.

8. The gas turbine blade according to claim 1, wherein the at least one matrix material comprises one or more of the following:
   a nickel-based material and a cobalt-based material.

9. The gas turbine blade according to claim 1, wherein at least one portion of the suction side of the gas turbine blade has an anti-adhesion layer.

10. The gas turbine blade according to claim 9, wherein the anti-adhesion layer has a thickness in a range between 100 nm and 900 nm.

11. The gas turbine blade according to claim 1, wherein at least a first portion of particles of the plurality of particles are exposed to external objects impacting the damping layer.

12. The gas turbine blade according to claim 11, wherein when an external object impacts one or more particles of the at least a first portion of particles of the plurality of particles, the at least one matrix material elastically deforms, allowing the external object to transfer kinetic energy to the one or more particles of the at least a first portion of the particles of the plurality of particles impacted by the external object, and wherein the at least one matrix material elastically deforming absorbs the kinetic energy transferred to the one or more particles of the at least a first portion of the particles of the plurality of particles.

13. The gas turbine blade according to claim 11,
wherein the at least a first portion of particles of the plurality of particles have a particle hardness that is greater than a matrix material hardness of the at least one matrix material.

14. The gas turbine blade according to claim 1,
wherein the at least one matrix material is a first matrix material.

15. The gas turbine blade according to claim 14,
wherein the gas turbine blade comprises a base matrix material, and
wherein the first matrix material is the same material as the base matrix material.

16. The gas turbine blade according to claim 1,
wherein the plurality of particles are surrounded by the at least one matrix material,
wherein when portions of the at least one matrix material wear away to expose at least a first portion of particles of the plurality of particles and an external object impacts one or more particles of the at least a first portion of particles of the plurality of particles the at least one matrix material elastically deforms, allowing the external object to transfer kinetic energy to the one or more particles of the at least a first portion of the particles of the plurality of particles impacted by the external object, and
wherein the at least one matrix material elastically deforming absorbs the kinetic energy transferred to the one or more particles of the at least a first portion of the particles of the plurality of particles.

17. A gas turbine, comprising:
a gas turbine blade according to claim 16.

18. A method of coating a gas turbine blade, comprising:
providing a gas turbine blade, wherein the gas turbine blade comprises:
a flow leading edge;
a flow trailing edge;
a suction side; and
a pressure side,
wherein the suction side and pressure side extend from the flow leading edge to the flow trailing edge; and
coating a damping layer on the flow leading edge,
wherein the damping layer comprises at least one matrix material and a plurality of particles held in position by the at least one matrix material,
wherein the damping layer comprises a pressure-side region and a suction-side region, and
wherein the pressure-side region has a pressure-side particle concentration of particles of the plurality of particles in the at least one matrix material that is higher than a suction-side particle concentration of particles of the plurality of particles in the at least one matrix material of the suction-side region.

19. The method according to claim 18,
wherein coating the damping layer comprises coating the damping layer via deposition welding.

20. A gas turbine, comprising:
a plurality of gas turbine blades,
wherein each gas turbine blade of the plurality of gas turbine blades comprises:
a flow leading edge;
a flow trailing edge;
a suction side; and
a pressure side,
wherein the suction side and pressure side extend from the flow leading edge to the flow trailing edge,
wherein each gas turbine blade of the plurality of gas turbine blades comprises a damping layer on the flow leading edge,
wherein the damping layer comprises at least one matrix material and a plurality of particles,
wherein the plurality of particles are held in position by the at least one matrix material,
wherein the damping layer comprises a pressure-side region and a suction-side region, and
wherein the pressure-side region has a pressure-side particle concentration of particles of the plurality of particles in the at least one matrix material that is higher than a suction-side particle concentration of particles of the plurality of particles in the at least one matrix material of the suction-side region.

21. The gas turbine according to claim 20,
wherein for each gas turbine blade of the plurality of gas turbine blades, when at least a first portion of particles of the plurality of particles are exposed to external objects impacting the damping layer, the gas turbine is operating, and an external object impacts one or more particles of the at least a first portion of particles of the plurality of particles, the at least one matrix material elastically deforms, allowing the external object to transfer kinetic energy to the one or more particles of the at least a first portion of the particles of the plurality of particles impacted by the external object, and
wherein the at least one matrix material elastically deforming absorbs the kinetic energy transferred to the one or more particles of the at least a first portion of the particles of the plurality of particles, such that the external object is less likely to hit the suction side of an adjacent gas turbine blade of the plurality of gas turbine blades toward which the pressure side of the each gas turbine blade of the plurality of gas turbine blades faces.

* * * * *